United States Patent

[11] 3,627,370

| [72] | Inventors | Donald R. Whiteman<br>R.D. #1, Fairfield Park, Roxboro, N.C.;<br>Jack E. Fathauer, P.O. Box 24, Roxboro,<br>N.C. 27573 |
|------|-----------|---|
| [21] | Appl. No. | 868,107 |
| [22] | Filed     | Oct. 21, 1969 |
| [45] | Patented  | Dec. 14, 1971 |

[54] EXPANDABLE SPREADER WITH BELOW-DECK MOBILITY
7 Claims, 15 Drawing Figs.

| [52] | U.S. Cl. | 294/67 R, 294/81 SF |
|------|----------|---|
| [51] | Int. Cl. | B66c 1/00 |
| [50] | Field of Search | 294/67, 81, 81 SF, 88 |

[56] References Cited
UNITED STATES PATENTS

| 2,842,391 | 7/1958 | Hermann | 294/67 |
| 3,101,967 | 8/1963 | Wyrough | 294/88 |
| 3,514,146 | 5/1970 | Zweifel et al. | 294/67 |

*Primary Examiner*—Evon C. Blunk
*Assistant Examiner*—Johnny D. Cherry
*Attorneys*—Woodrow W. Portz and Irvin L. Groh ABSTRACT: An expandable spreader capable of handling cargo containers varying, for example, from 20 to 40 feet in length having subframes which are traversable within a main frame with the spreader as a whole being contractable to substantially within the plan contour of the base frame, and, most importantly, within the plan contour of the smallest container which the spreader is designed to handle.

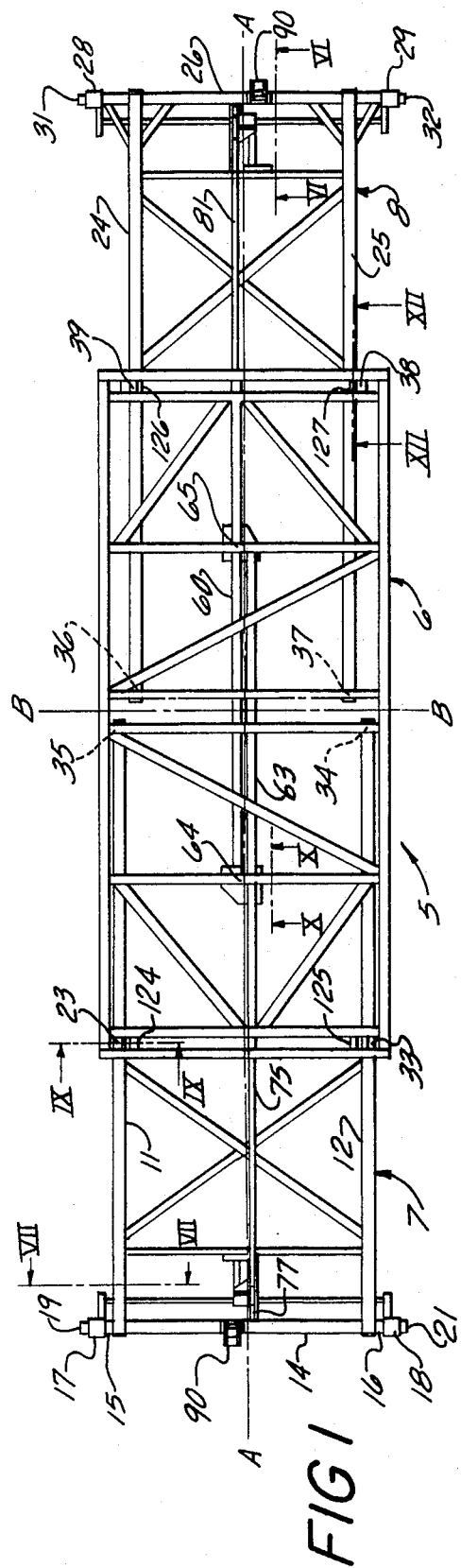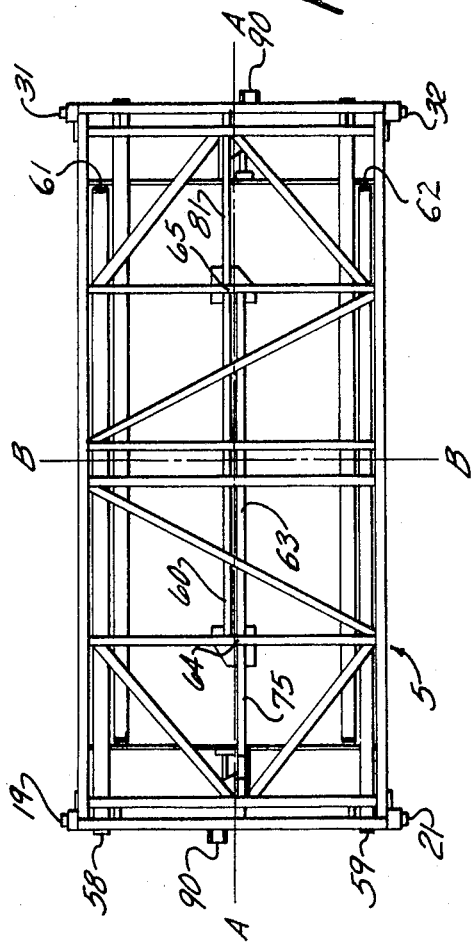

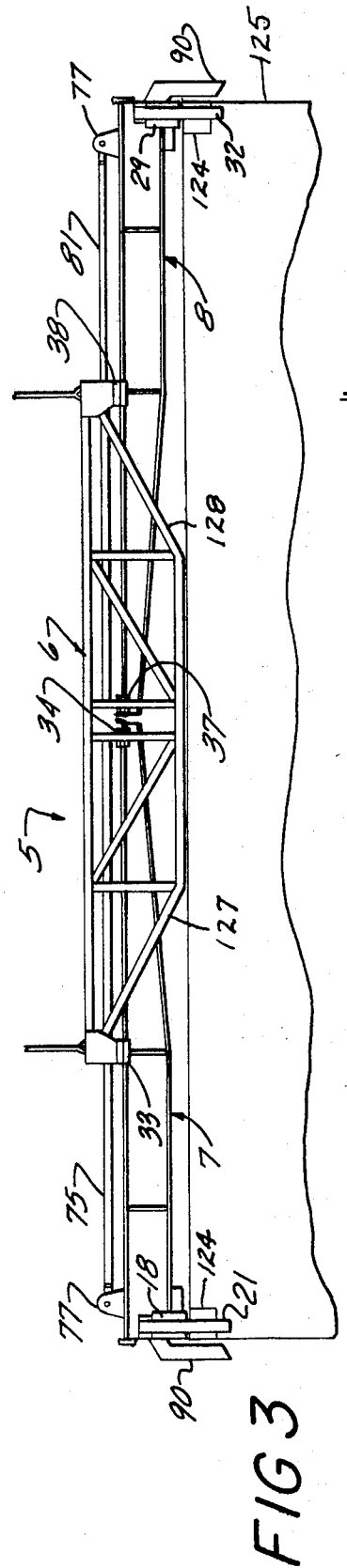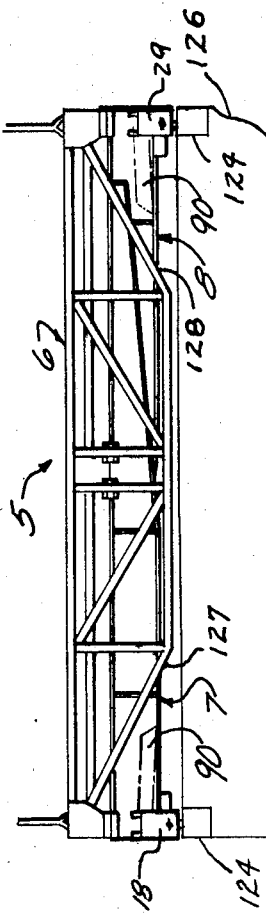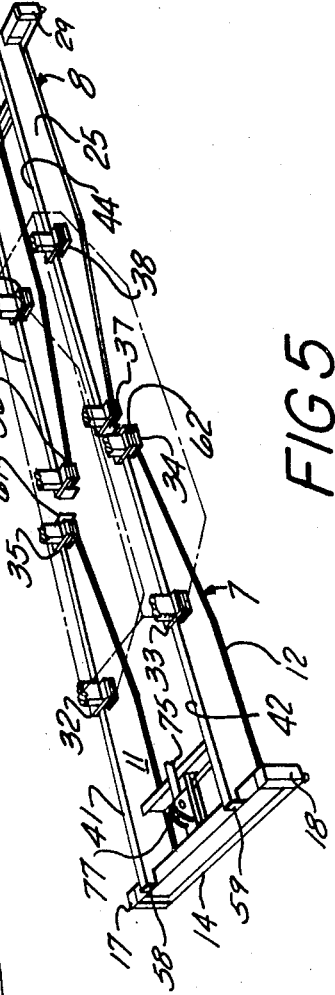

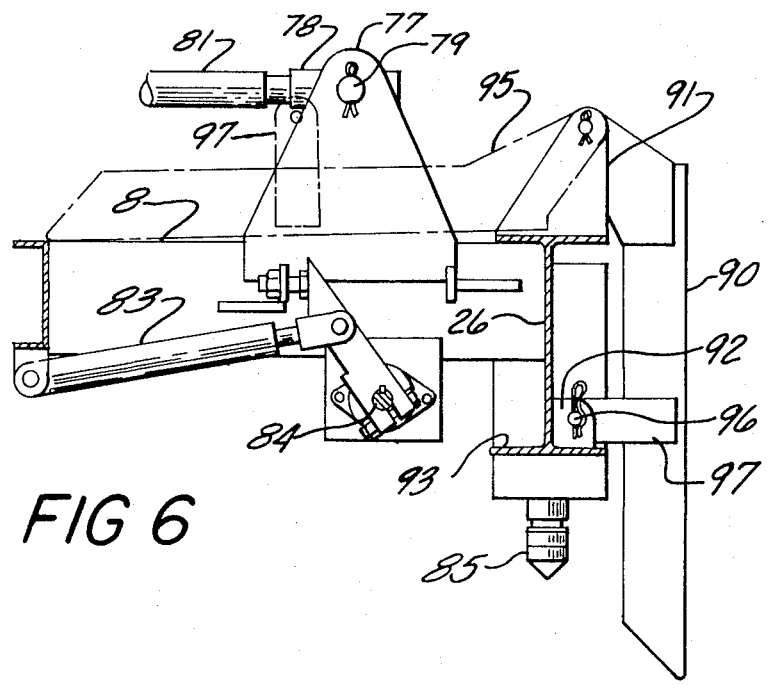
FIG 6
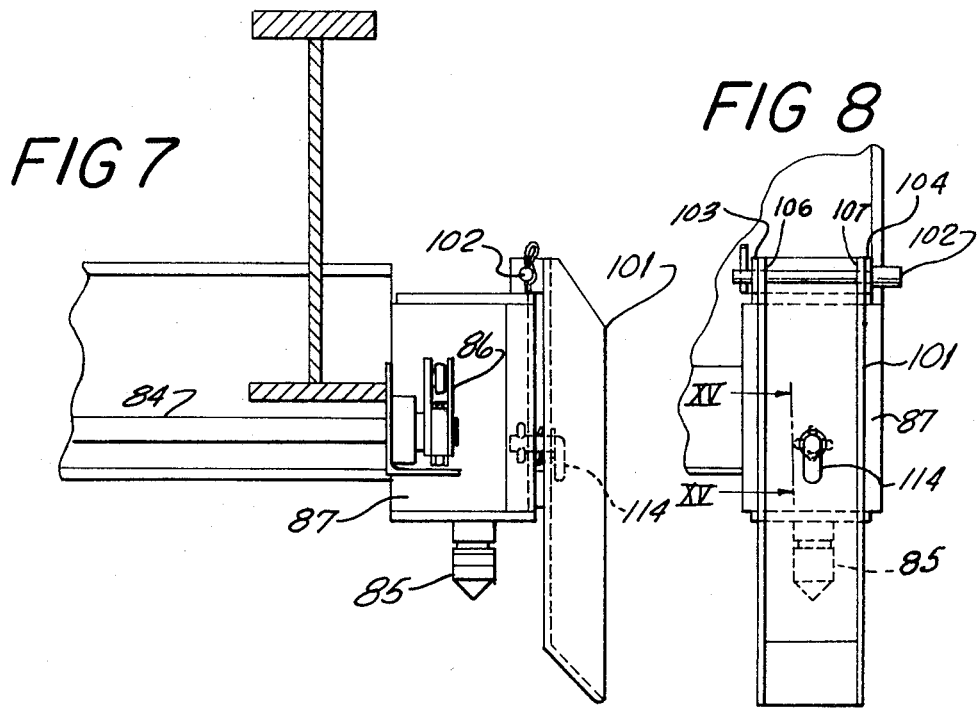
FIG 7
FIG 8

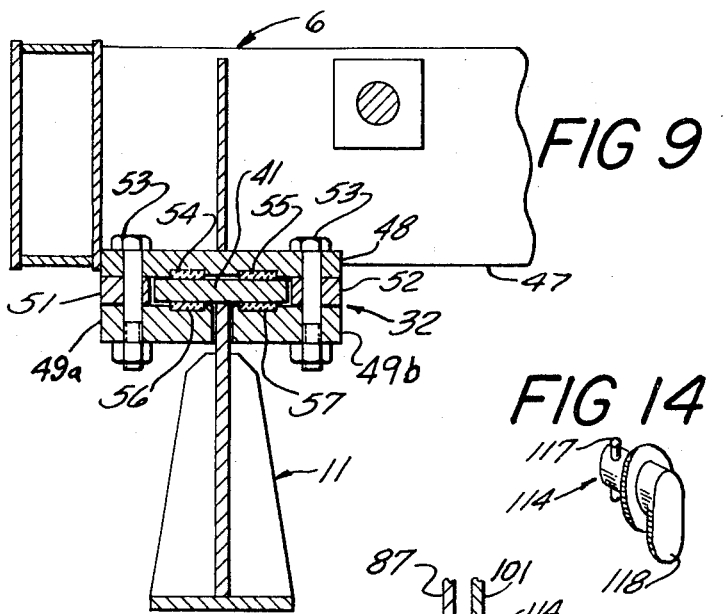
FIG 9
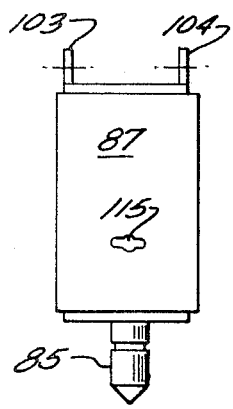
FIG 13
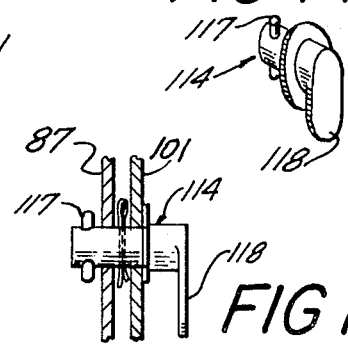
FIG 14
FIG 15
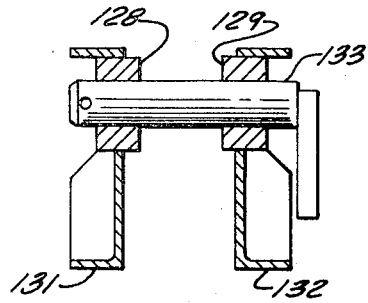
FIG 12
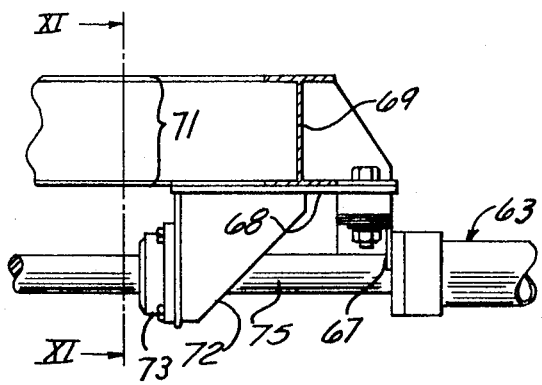
FIG 10
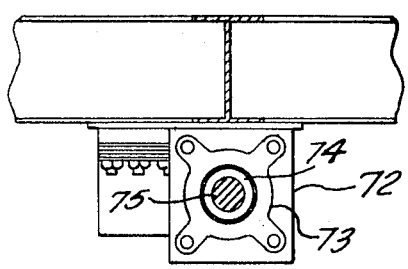
FIG 11
INVENTORS
DONALD R. WHITEMAN
JACK E. FATHAUER
BY
ATTORNEY

EXPANDABLE SPREADER WITH BELOW-DECK MOBILITY

DESCRIPTION

As one aspect of the rapid drift to containerization within the transportation industry, there is a recognition that the sizes of shipments vary to an extent requiring the use of containers of different sizes. Variation in container size is also influenced by the need to have containers that may be readily transported regardless of whether the transporting vehicle therefor moves by railway, highway, air, or water. An important consideration in varying the size of containers is the considerable cost in providing equipment which will handle all containers that may be processed in the operation of a transportation facility such as a freight terminal, ship, or other vehicle. An important criterion is that a standard width be maintained so that the lengths of the containers may be varied to provide variation in the container volume. Thus, the complexity of spreaders is limited to that necessary to provide spreader expansion in merely one direction. Linearly expandable spreaders are known to the industry. However, because of rapid developments in the handling and storing of containers, spreaders which may contract in a satisfactory manner for entering the holds of ships or transferring containers into and out of compact stacks of containers are seen to be greatly needed by the transportation industry in spite of some engineering difficulties. For example, in order for a spreader to pick up a 40-foot as well as a 20-foot container, it is necessary to double the overall length of the spreader. In the past, difficulty has arisen in building a spreader that has this adjustability while staying within the top contours of the containers which it can handle.

Hence, an important object is to provide an expandable spreader which is dimensionally restricted to the horizontal cross section of any of the containers the spreader is designed to pick up but has the capacity for handling loads, such as a 40-foot cargo container and the heavy loads which are frequently placed therein.

Other objects are: that the spreader be readily adjustable by power means; that it be expandable to approximately double its retracted length but not to a length any greater than such expanded length in order to avoid spreader overhang; and that it be adaptable for use with various types of cranes and other hoisting machinery.

These and any other objects of the invention are accomplished in a spreader for cargo containers having a generally rectangular base frame on which two subframes, preferably U-shaped are movably supported. Because of the need for space underneath the base frame for movement of the subframes with a container suspended thereon, the base frame necessarily comprises vertically extending side trusses which extend the full length of the base frame and spanning members fixed to, and extending between, upper portions of the trusses overhead the subframes. The subframes are supported on the trusses in a manner allowing rectilinear movement by guide means, such as C-shaped bearing blocks affixed to the trusses in conforming relation with the flanges of the subframes. The subframes have laterally extending beams or other structure at the outer ends of the subframes for supporting latching mechanism for attaching a spreader to containers in order that the overall width and length of the spreader does not exceed that of a container to which the spreader has been longitudinally adjusted.

In the preferred spreader embodiment, the essential frame elements of the subframes impart a U-shape in the horizontal direction as a result of the two legs of each subframe being joined by a tie member. Typically, the tie member extends outboardly of the legs to provide the above-named supports of the four latching units. In order that a spreader be able to handle containers which are twice the length of the minimum length containers handled, the legs of the subframes are substantially as long as the base frame for achieving maximum supporting capacity of the spreader.

In the drawing with respect to which the invention is described:

FIG. 1 is a skeletal plan view of a spreader in accordance with the invention in its expanded condition;

FIG. 2 is a skeletal plan view of the spreader of FIG. 1 in its contracted condition;

FIG. 3 is a side longitudinal view of the spreader of FIGS. 1 and 2 in expanded condition;

FIG. 4 is a side longitudinal view of the spreader of FIGS. 1, 2 and 3 in contracted position with load alignment guides retracted;

FIG. 5 is a schematic perspective view illustrating the geometric interrelationship of base frame and subframes of the spreader of FIGS. 1-4;

FIG. 6 is a fragmentary elevation taken along line VI—VI of FIG. 1, illustrating a latch actuator and a load-aligning guide;

FIG. 7 is a fragmentary elevation taken along line VII—VII of FIG. 1, illustrating still another portion of latch-operating mechanism and another type of retracting load-aligning guide;

FIG. 8 is a side elevation of the guide and adjacent spreader structure shown in FIG. 7;

FIG. 9 is a fragmentary elevation taken along line IX—IX, illustrating guide bearing structure typical of the bearings for connecting the base frame with the subframes;

FIG. 10 is a fragmentary side elevation as viewed along line X—X of FIG. 1 of structure for supporting subframe traversing cylinders;

FIG. 11 is a fragmentary elevation taken along line XI—XI of FIG. 10;

FIG. 12 is a fragmentary elevation as viewed along line XII—XII of FIG. 1, illustrating a pin arrangement for connecting the spreader with a crane;

FIG. 13 is a side elevation of the latch housing of FIG. 8 with the retracting guide removed;

FIG. 14 is a perspective view of a latch carried by the guide 8 to secure the retracting guide to the housing of FIG. 13; and FIG. 15 is a fragmentary section, in elevation, taken along line XV—XV of FIG. 8, illustrating the use of the latch of FIG. 14.

FIGS. 1 and 3 of the drawing are plan and side views, respectively, of a spreader 5 shown in its fully extended condition, whereas FIGS. 2 and 4, also plan and side views respectively, show the spreader in its fully longitudinally contracted condition. FIG. 5 attempts by perspective schematic representation to more clearly illustrate the connective relationships between the base frame 6 and subframes 7, 8.

The subframes 7, 8 each comprise essentially a pair of spaced parallel legs and at least one tie member which, in the simplest embodiment of the spreader, may connect the legs, as shown, at their outermost ends. For example, subframe 7 comprises legs 11, 12 and a tie member or beam 14 which projects outboardly of the legs as portions 15, 16. These beam portions function as supports for latch housings 17, 18 and alignment guides 19 and 21 pivotally attached to the latch housings. In a similar manner, the subframe 8 comprises legs 24, 25 connected at their longitudinally outward extremities by a beam 26 functioning similarly to beam 14 to contribute a U-configuration to the subframe 8. Since the legs of subframe 7 are spaced further apart than the legs of subframe 8, the subframes 7, 8 are able to move into the positions shown in FIGS. 2 and 4 which place the spreader in fully retracted condition. As shown by FIG. 2, the legs of subframe 7 are spaced sufficiently to receive the legs of the subframe 8 therebetween with major portions of the legs of both subframes in longitudinally overlapping or coextensive relationship along separate axes or paths of movement extending longitudinally of the base frame 6. Beam 26 is equal in length to beam 14 and, since the spacing of legs 24,25 is less than that of the legs of frame 7, 24, 25 longer portions of the beam 26 extend outboardly of legs 24, 25 to support latch housings 28, 29 at the same transverse spacing as latch housings 17, 18. The latch housings, in turn, support guides 31, 32.

As guiding structure by which the subframes are supported and traversed relative to the base frame 6, the portion of the guiding means attributable to the base frame comprises, in the present embodiment, eight slide blocks or bearings 32–39.

The portion of the guiding means attributable to the subframes comprises top flanges 41 to 44 of legs or rails 11, 12, 24, 25, respectively.

FIG. 10 illustrates slide or bearing block 32 which has construction typical in cross section to that of the other slide blocks 33 to 39. The bearing blocks 32, 33, 38, 39 at the outward ends of the base frame 6 may be constructed to greater length in the longitudinal direction of the base frame to provide for vertical load forces which are substantially greater at the outer bearings than at the inner bearings 34, 35, 36, 37. Indeed, at extended positions of the subframes the inner bearings are loaded upwardly rather than downwardly. In the embodiment shown, the bearing blocks supporting the subframe are located in the respective half-length of the base frame at the side of the central transverse axis B—B of the base frame with respect to which the subframe moves outwardly of the base frame. Further shown is that the spreader is generally symmetrical in the transverse direction with respect to a central longitudinal axis A—A. As shown in FIG. 9, the bearing block 32 comprises an upper plate 48, lower plates 49 and 49b, intermediate spacers 51, 52 secured together by bolts 53, and wear strips 54 to 57. The bearing blocks are of generally steel construction but the wear strips may be of brass or other material softer than steel to reduce friction and render the blocks self-lubricating. The upper and lower plates and associated wear strips are spaced to permit passage therethrough of the top flange 41 of the leg or rail 11. As FIG. 5 illustrates, the other rails of both subframes are similarly received in a pair of bearing blocks which extend around the top flange of each rail C-fashion to enable movement of either subframe inwardly or outwardly relative to the base frame 6. Movement of a subframe relative to the base frame may be limited as shown, i.e., by stop plates extending above the top flanges of the subframe rail and attached at the outward and inward ends thereof. For example, rails 11 and 12 have outward stops 58, 59, respectively, for engaging blocks 32, 33 and inward stops 61, 62 respectively, for engaging blocks 34, 35. The subframe 8 is shown with similar stops.

The subframes are moved relative to the base frame in the present embodiment through the operation of a pair of elongate fluid cylinders 60, 63 supported centrally of the base frame on opposite sides and in close juxtaposition with a central vertical longitudinal plane containing the axis A—A. The stroke and length of the cylinder in each case is at least one-half the length of the base frame in order that the extensibility of the spreader as a whole be such as to double its length, e.g., in adjusting the length of the spreader from 20-foot containers to 40-foot containers. As shown, both cylinders are supported within the framework of the base frame at 64 and 65 by suitable brackets.

FIGS. 10 and 11 illustrate a mode of support for the piston rod end of the cylinder 63. The end of the cylinder 63 is attached by a bracket 67 bolted to a plate 68 welded or otherwise fastened to a spanning member 69 and a longitudinal frame member 71. A bracket 72 is also attached to the plate 68 to which is attached a housing 73 in which is secured a sleeve 74 of nongalling material, such as brass, for slidably supporting the cylinder rod 75. The piston rod 75 or 81 of subframe 7 or 8, respectively, extends longitudinally outwardly through a space underneath the top spanning members of the base frame and above all transverse structure of the subframe 7 to a clevis 77 projecting upwardly from the plane of the top frame structure of the base frame. The cylinder rod terminates in an "eye" fitting 78 which is pivotally secured to the clevis by a pin 79.

FIG. 6 is of further interest regarding mechanism including a cylinder 83 which rotates a shaft 84 extending transversely of the subframe 8 for operating conventional linkage and latching systems terminating in standard twist locks, such as the twist lock 85. The shaft 84 also appears in FIG. 7 and terminates in a linkage 86 entering the latching housing 87 and connecting with the twist lock actuating mechanism housed therein. Of interest regarding FIGS. 6 and 7 are the two types of retractable guides shown. FIG. 6 shows a guide 90 of the type which may be mounted centrally along end beams 14 or 26 of the subframes. The guide 90 is attached to the subframe 7 or 8 by being pinned to a clevis 91 mounted on the upper surface of beam 26 (or 14) and a clevis 92 attached to the upper surface of the lower beam flange 93. For working in closely packed stacks of containers or entering deck hatches of ships, the guide 90 may be shifted to a retracted position shown in dot-dash outline 95 after removing a pin 96 extending through the clevis 92 and a lug 97 of the guide to thus free the guide for pivoting movement.

FIG. 7 depicts another type of guide 101 in pinned and hinged relation with the latching housing 87. A pin 102 extends horizontally through lugs 103, 104 secured to the housing 87, and "eye" lugs 106, 107 of the guide. The guide 101 is secured to the housing 87 by a latch 114 forming a bayonet connection with the housing 87 when entered through an aperture 115 of the housing as dowels 117 radially protruding from the shaft portion of the latch 114 become positioned behind the wall of housing 87 as shown in FIG. 15. The latch has a handle 118 to facilitate a latching maneuver. The guide 101 may either be retracted within a vertical projection of the container sides by unlatching the latch 114 and swinging the guide 101 upwardly about the pin 102, or detached from the spreader by the above-indicated unlatching and withdrawal of the pin 102. In the most shortened condition of the spreader, the guide 101 cannot be pivoted to a desirable upward position and may then be detached.

FIG. 12 is illustrative of one of the four points 124–127 of the base frame at which the spreader 5 may be attached to a crane in a typical four-point suspension system.

Each point of connection may consist of the structure shown in FIG. 12 wherein bearings 128, 129 are provided in spanning members 131, 132 of the base frame with the bearings spaced to receive suitable connective elements of a crane, such as an "eye" fitting attached to a cable end. A pin 133 extends through the bearings to bridge the clearance therebetween and extends through such connective element.

FIGS. 3 and 4 illustrate the spreader 5 at maximum and minimum lengths, respectively, for latching with the upper corner castings 124 of containers 125 and 126 of corresponding lengths. To attain the shortened condition of FIG. 4, it should be noted that the trusses which form the sides of the base frame 6 have bottom end members 127 and 128 which incline upwardly toward adjacent ends of the base frame in a manner providing clearance underneath end and corner portions of the base frame to allow the beams 14 and 26 of the subframes to be positioned thereunder. This arrangement enables the subframes to pass into approximately complete longitudinally overlapping relation with a corresponding portion, substantially the full length of the base frame. Herein lies the capability of the spreader 5 to be shortened to a length within a vertical projection of the side and end surfaces of the minimum length container to be handled by the spreader. In accordance with the structural arrangement of the spreader, the length of the base frame 6 is no greater, and preferably slightly shorter, than such minimum length container. As shown in all embodiments, the legs of the subframes and the bearing supports provided therefor on the base frame are arranged for movement of the legs relative to the base frame along separate axes of movement relatively lengthwise of the base frame. Thus, the guide blocks or other guide means attached to each half of the base frame for any one subframe leg are positioned out of longitudinal alignment with the guide blocks for the other subframe legs.

What is claimed is:

1. A longitudinally adjustable spreader for cargo containers of different lengths comprising:
   a generally rectangular base frame centered with respect to relatively perpendicular longitudinal and transverse axes disposed in a normally horizontal plane, said frame having connecting means adapting the frame for attachment to hoisting equipment;

a pair of subframes, movably supported on said base frame, each substantially as long as the base frame and comprising parallel rectilinear legs aligned lengthwise of the machine, and a tie member joining the legs extending transversely of the main frame;

latching means mounted at the outer end of each subframe generally equidistantly from said longitudinal axis and projecting downwardly from the subframes adapting the spreader for connection with the upper portion of a cargo container;

guide means shared by the legs of each subframe and a half-length of the base frame from which said subframe is supported defining a path of movement lengthwise of the base frame, the guide means of each half-length for each leg being out of longitudinal alignment with the guide means for any other of said legs, the portion of said guide means associated with the base frame being spaced at least over a major portion of the half-length and arranged to enable the subframe supported thereon to move from a position wherein it extends outward from the outer end of said supporting half-length to a position inward of the frame disposing approximately the entire length of each subframe in telescoping relation with the base frame;

the legs of said subframes and said guide means being spaced and arranged to pass into longitudinally overlapping relation with each other.

2. The combination of the spreader of claim 1 and a plurality of cargo containers of the same width but differing in length, each having corner receptacles for interlocking with said latching means;

said base frame being of a length slightly less than that of the shortest of said plurality of containers.

3. The spreader of claim 1 comprising:

power means for traversing the subframes lengthwise of said base frame;

said base frame having top transverse spanning members with said subframes spaced downwardly therefrom and said power means disposed therebetween.

4. The spreader of claim 3 wherein:

said subframes have bearing means fixed thereto projecting upwardly into said space;

said power means comprises a fluid cylinder for each subframe having one of two relatively movable portions attached to at least one spanning member and the other of said portions attached to said bearing means, said fluid cylinders being attached to respective subframes and the base frame in generally parallel relation with said longitudinal axis.

5. The spreader of claim 1 wherein:

the subframes are U-shaped with said tie member of each frame bridging the outer ends of its legs, and the legs of one subframe are received between the legs of the other subframe.

6. The combination of the spreader of claim 1 and a plurality of cargo containers of the same width but differing in length, each having similar corner receptacles for interlocking with said latching means;

said frame and subframes being constructed to dispose all portions of said spreader within a vertical projection of the sides of any one of said containers interlocked with said latching means.

7. The spreader of claim 1 wherein:

said subframes comprise beam means at respective outer ends which extend laterally outboardly from the legs of each subframe to provide supports for said latching means;

said base frame comprises longitudinal vertically extending trusses along opposite sides joined transversely between their top portions by horizontal spanning members, each truss having bottom end members inclining upwardly and joining in an upper end portion of the truss; and said supports are receivable under said bottom members and other end portions of the base frame at the most retracted condition of the spreader.

* * * * *

PO-1050
(5/69)

UNITED STATES PATENT OFFICE
CERTIFICATE OF CORRECTION

Patent No. 3,627,370                    Dated  December 14, 1971

Inventor(s) Donald R. Whiteman and Jack E. Fathauer

It is certified that error appears in the above-identified patent and that said Letters Patent are hereby corrected as shown below:

The assignee is Midland-Ross Corporation, Cleveland, Ohio.

Column 1, line 46, before "trusses" insert -- member or --.

Line 50, change "trusses" to -- base frame --.

Line 51, delete "trusses".
Column 2, line 67, delete "24, 25" after "frame 7 ".

Line 75, before the period, insert -- attached to and depending from transversely-extending elements of the base frame as shown, for example, in Fig. 9 --.

Column 3, line 20, after "48" insert -- attached to a transverse element 47 of the base frame 6 --.

Claim 1 should read: 1. A longitudinally adjustable spreader for cargo containers of different lengths comprising:
    a generally rectangular base frame centered with respect to relatively perpendicular longitudinal and transverse axes disposed in a normally horizontal plane, said frame having longitudinally extending side members, transversely extending frame elements connecting the side members at the top of the spreader, and connecting means adapting the frame for attachment to hoisting equipment;
    a pair of subframes, movably supported on said base frame, each substantially as long as the base frame and comprising parallel rectilinear legs aligned lengthwise of the base frame, and a tie member joining the legs extending transversely of the main frame;

PO-1050
(5/69)

UNITED STATES PATENT OFFICE
CERTIFICATE OF CORRECTION page two

Patent No. 3,627,370      Dated December 14, 1971

Inventor(s) Donald R. Whiteman and Jack E. Fathauer

It is certified that error appears in the above-identified patent and that said Letters Patent are hereby corrected as shown below:

latching means mounted at the outer end of each subframe generally equidistantly from said longitudinal axis and projecting downwardly from the subframes adapting the spreader for connection with the upper portion of a cargo container;

guide means shared by the legs of each subframe and a half-length of the base frame from which said subframe is supported defining a path of movement lengthwise of the base frame, the guide means of each half-length for each leg being out of longitudinal alignment with the guide means for any other of said legs and said side members of the base frame, the portion of said guide means connected with the base frame for guiding each one of said subframes depending from said frame elements and being spaced at least over a major portion of the half-length from which it is suspended and arranged to enable the subframe supported thereon to move from a position wherein it extends outward from the outer end of said supporting half-length to a position inward of the frame disposing approximately the entire length of each subframe within the length of the base frame;

the legs of said subframes and said guide means being spaced and arranged for said legs to pass into longitudinally-overlapping relation with each other along separate laterally-spaced axes of movement.

Cancel claim 6.

Signed and sealed this 22nd day of August 1972.

(SEAL)
Attest:

EDWARD M. FLETCHER, JR.      ROBERT GOTTSCHALK
Attesting Officer                Commissioner of Patents